(12) United States Patent
Zheng et al.

(10) Patent No.: US 11,609,439 B2
(45) Date of Patent: Mar. 21, 2023

(54) CONTACT LENS AND CONTACT LENS ASSEMBLY

(71) Applicants: BEIJING BOE DISPLAY TECHNOLOGY CO., LTD., Beijing (CN); BOE TECHNOLOGY GROUP CO., LTD., Beijing (CN)

(72) Inventors: Enqiang Zheng, Beijing (CN); Wenfeng Ma, Beijing (CN); Tianyu Zuo, Beijing (CN); Haoliang Ji, Beijing (CN); Xiaopeng Cui, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 203 days.

(21) Appl. No.: 16/710,532

(22) Filed: Dec. 11, 2019

(65) Prior Publication Data
US 2020/0310163 A1    Oct. 1, 2020

(30) Foreign Application Priority Data

Mar. 27, 2019   (CN) .......................... 201910237192.0

(51) Int. Cl.
*G02C 7/04* (2006.01)

(52) U.S. Cl.
CPC ............. *G02C 7/049* (2013.01); *G02C 7/048* (2013.01)

(58) Field of Classification Search
CPC ........ G02C 7/049; G02C 7/048; G02C 7/081; G02C 7/04; G02C 7/047
See application file for complete search history.

(56) References Cited

U.S. PATENT DOCUMENTS

| | | | |
|---|---|---|---|
| 9,375,886 B2* | 6/2016 | Pugh | G02C 7/04 |
| 2014/0335661 A1* | 11/2014 | Pugh | G02C 11/10 |
| | | | 438/126 |
| 2017/0261453 A1* | 9/2017 | Dumitru | G01N 27/121 |
| 2017/0293197 A1* | 10/2017 | Van Heugten | A61F 2/1627 |
| 2018/0088352 A1* | 3/2018 | Kennedy | G02C 7/049 |
| 2018/0246049 A1* | 8/2018 | Gutierrez | G02C 11/10 |
| 2020/0166777 A1* | 5/2020 | Rafaeli | G02C 7/049 |

OTHER PUBLICATIONS

Examiner provided machine translation of Hamamotoi, JP 2018524637 (Year: 2018).*

* cited by examiner

*Primary Examiner* — Balram T Parbadia
*Assistant Examiner* — Gabriel A Sanz
(74) *Attorney, Agent, or Firm* — Leason Ellis LLP

(57) ABSTRACT

A contact lens and a contact lens assembly are provided. The contact lens includes a lens and a deformation unit. The lens configured to be worn in a human eye. The deformation unit is mounted to the lens and configured to deform according to a deformation voltage to make the lens deformed.

15 Claims, 3 Drawing Sheets

CONTACT LENS AND CONTACT LENS ASSEMBLY

CROSS-REFERENCE TO RELATED APPLICATION

The present disclosure claims priority of Chinese Patent Application No. 201910237192.0 filed on Mar. 27, 2019, the disclosure of which is hereby entirely incorporated by reference as a part of the present disclosure.

TECHNICAL FIELD

Embodiments of the present disclosure relates to a field of contact lens, and in particular, to a contact lens and a contact lens assembly.

BACKGROUND

At present, with the continuous development of artificial intelligence technology, various smart devices are gradually emerging. Among them, as a wearable device, contact lenses have attracted wide attention because of their flexibility, small size, flexibility and convenience. Smart contact lenses have many application, such as virtual displaying, augmented reality displaying or eye tracking.

SUMMARY

At least one embodiment of the present disclosure provides a contact lens, including a lens and a deformation unit. The lens is configured to be worn in a human eye. The deformation unit, mounted to the lens and configured to receive a deformation voltage and deform according to the deformation voltage to make the lens deform.

For example, in some embodiments, a deformation of the lens is an increase of a curvature of the lens.

For example, in some embodiments, the contact lens further includes a detecting unit. The detecting unit is mounted to the lens and configured to detect a water content of the lens and to control the deformation voltage which is received by the deformation unit based on the detected water content.

For example, in some embodiments, the detecting unit includes a thin film transistor. The thin film transistor includes an active layer having an electrical conductivity that changes according to the water content.

For example, in some embodiments, in response to that the water content is not greater than a water content threshold, the active layer is in a first conductive state. For example, in some embodiments, in response to that the water content is greater than the water content threshold, the active layer is in a second conductive state. An electrical conductivity of the active layer in the first conductive state is greater than an electrical conductivity of the active layer in the second conductive state.

For example, in some embodiments, the active layer is formed of pentacene, lithium chloride, $Fe_3O_4$, ZnO, $Al_2O_3$ or $TiO_2$.

For example, in some embodiments, the deformation unit includes a first electrode, a deformable layer and a second electrode. The deformable layer is formed between the first electrode and the second electrode.

For example, in some embodiments, the first electrode and the second electrode are formed of a transparent flexible conductive polymer, and the deformable layer is formed of an electrostrictive material.

For example, in some embodiments, the contact lens further includes a power supply. The power supply is configured to supply power to the deformation unit via the detecting unit.

For example, in some embodiments, the power supply is an organic solar battery.

For example, in some embodiments, the power supply includes a first power supply electrode and a second power supply electrode, and the thin film transistor includes a control electrode, a first transistor electrode, and a second transistor electrode. The first transistor electrode of the thin film transistor is connected to the first power supply electrode of the power supply, the second transistor electrode of the thin film transistor is connected to the first electrode of the deformation unit, and the second electrode of the deformation unit is connected to the second power supply electrode of the power supply.

For example, in some embodiments, the control electrode of the thin film transistor is connected to the first power supply electrode of the power supply.

For example, in some embodiments, the contact lens further includes a protective layer. A groove of the lens is on a side of the lens. The detecting unit, the deformation unit and the power supply are formed in the groove, and the protective layer covers the detecting unit, the power supply, and the deformation unit.

For example, in some embodiments, a material of the protective layer is the same with the material of the lens.

For example, in some embodiments, the detection unit, the deformation unit, and the power supply are encapsulated within the lens.

For example, in some embodiments, the contact lens further includes a communication transmission unit. The detecting unit is connected to the communication transmission unit, and is configured to enable an electrical connection of the communication transmission unit with the power supply in response to that the water content is not greater than a water content threshold. The communication transmission unit is connected to the power supply and is configured to transmit information to an external device.

At least one embodiment of the present disclosure provides a contact lens assembly, including a contact lens and a terminal. For example, in some embodiments, the contact lens includes a lens, a detecting unit and a deformation unit. The lens configured to be worn in a human eye. The deformation unit is mounted to the lens and configured to receive a deformation voltage and to deform according to the deformation voltage to make the lens deform. The detecting unit is mounted to the lens and configured to detect a water content of the lens and to control the deformation voltage which is received by the deformation unit based on the detected water content. The terminal is configured to receive information about the water content from the contact lens and to generate alarm information when the water content is not greater than a water content threshold.

For example, in some embodiments, the detecting unit includes a thin film transistor. The thin film transistor includes an active layer having an electrical conductivity that changes according to the water content.

For example, in some embodiments, in response to that the water content is not greater than a water content threshold, the active layer is in a first conductive state. For example, in some embodiments, in response to that the water content is greater than the water content threshold, the active layer is in a second conductive state. An electrical conductivity of the active layer in the first conductive state is greater than an electrical conductivity of the active layer in the second conductive state.

For example, in some embodiments, the deformation unit includes a first electrode, a deformable layer and a second electrode, and the deformable layer is formed between the first electrode and the second electrode.

At least one embodiment of the present disclosure provides a method for manufacturing a contact lens including a lens, a detecting unit and a deformation unit. The lens is configured to be worn in a human eye. The deformation unit is mounted to the lens and configured to receive a deformation voltage and to deform according to the deformation voltage to make the lens deform. The detecting unit is mounted to the lens and configured to detect a water content of the lens and to control the deformation voltage received by the deformation unit based on the detected water content. The method includes: providing the lens; and mounting the detection unit and the deformation unit to the lens.

For example, in some embodiments, the method further includes forming the detection unit and forming the deformation unit. The forming of the detecting unit includes: forming a control electrode, forming an active layer, forming an insulating layer between the control electrode and the active layer, and forming a first transistor electrode and a second transistor electrode. The forming of the deformation unit includes: forming a first electrode, forming a second electrode, and forming a deformable layer between the first electrode and the second electrode.

For example, in some embodiments, the method further includes forming the deformation unit. The forming of the deformation unit includes: forming a first electrode by coating an isopropanol solution, adding a flexible conductive polymer on the isopropanol solution, baking at a temperature of 100 to 150 degrees Celsius; forming a deformable layer by using an evaporation coating process on the first electrode; forming a second electrode by coating an isopropanol solution on the deformable layer, adding a flexible conductive polymer on the isopropanol solution, and baking at a temperature of 100 to 150 degrees Celsius.

BRIEF DESCRIPTION OF THE DRAWINGS

In order to more clearly illustrate the technical solutions of at least one embodiment of the present disclosure or of the prior art, the drawings to be used in the description of the embodiments or of the prior art will be briefly described below. It is obvious that the drawings described below are only related to some embodiments of the disclosure and other drawings may also be obtained from these drawings without any creative labor for those of ordinary skill in the art.

DETAILED DESCRIPTION

Figure 1:
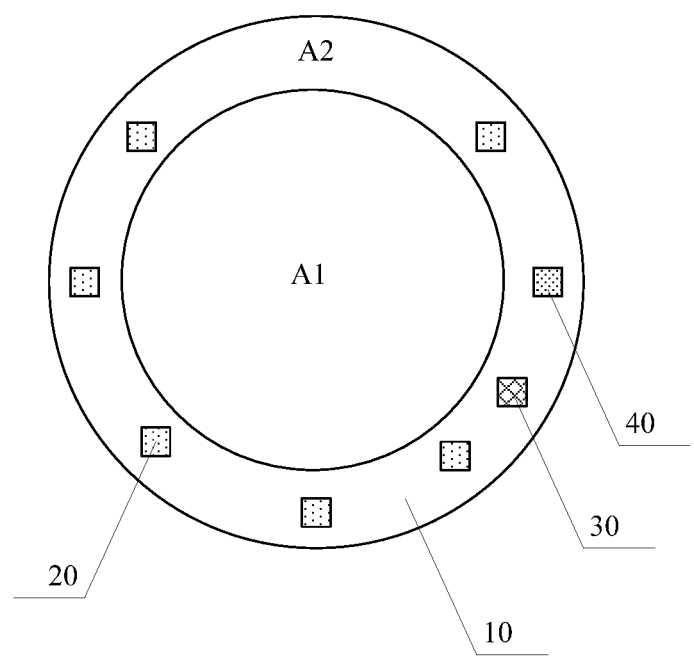
FIG. 1 is a schematic top view of a contact lens according to an embodiment of the disclosure.

In order to make objects, technical details and advantages of the disclosure apparent, the embodiments of the present disclosure will be described in detail below with reference to the accompanying drawings. It should be noted that, in the case of no conflict, the features in the embodiments and the embodiments in the present disclosure may be arbitrarily combined with each other.

The steps as illustrated in the flowchart of the accompanying drawings may be executed in a computer system such as a set of computer executable instructions. Also, although logical sequences are shown in the flowcharts, in some cases the steps shown or described may be performed in a different order than the ones described herein.

Unless otherwise defined, technical terms or scientific terms used in the embodiments of the present disclosure are intended to be understood in the ordinary meaning of the ordinary skill of the art. The words "first", "second", and similar terms used in the present disclosure do not indicate any order, quantity, or importance, but are used to distinguish different components. The words "comprise", "include" or the like means that the elements or items preceding the word include the elements or items after the word and their equivalents, but do not exclude other elements or items. The words "connect", "interconnect" or the like are not limited to physical or mechanical connections, but may include electrical connections, either directly or indirectly. The words "upper", "lower", "left", "right" and the like are only used to indicate the relative positional relationships, and when the absolute position of the object described is changed, the relative positional relationship may also change accordingly.

Contact lenses are intended to be worn under eyelids of a person. In the related art, contact lenses suffer from a great restriction on wearing comfort due to material characteristics. The higher the moisture content of a contact lens is, the better the oxygen permeability of the contact lens is and the softer the contact lens is. However, when the water content exceeds 50%, the contact lens is prone to be broken and deformed. In addition, when the water content is high, the water loss capacity of the contact lens is high, and the water losing contact lens absorbs the tear liquid from the human eye to replenish the water. At this time, the contact lens is not comfortable for a user to wear, and it is easy for the user to perceive it. When the water content is low, the contact lens does not absorb the tear liquid from the human eye, and the wearing comfort is good. Therefore, the user would not perceive the contact lens. However, when the water content is low, the oxygen permeability of the contact lens is low, which causes the cornea of the human eye to suffer from hypoxia. The long-term of hypoxia of the cornea will result in chronic corneal edema, corneal neovascularization and the like, and thus the risk of corneal damage is greater.

According to the research by the inventors of the present disclosure, users cannot detect the water content of the contact lens when wearing the contact lens, but when the water content is small, the oxygen permeability of the lens is poor, so that the cornea of the human eye cannot be Exposure to oxygen has a greater risk of corneal damage.

FIG. 1 is a schematic top view of a contact lens according to an embodiment of the disclosure. As shown in FIG. 1, a contact lens provided by an embodiment of the present disclosure includes a lens 10, a detecting unit 20, and a deformation unit 30. The detecting unit 20 and the deformation unit 30 are mounted to the lens 10.

The detecting unit 20 is connected to the deformation unit 30 and is used to detect the water content of the lens 10. The detecting unit 20 controls the deformation voltage received by the deformation unit 30 based on the measured water content. For example, the detecting unit 20 controls the deformation voltage provided to the deformation unit 30 by other elements or the detection unit 20 itself based on the measured water content. The deformation unit 30 deforms based on the deformation voltage. For example, the detection unit 20 supplies the deformation voltage to the deformation unit 30 in the case where the water content is not greater than a water content threshold. The deformation unit 30 is configured to deform under the deformation voltage so that the lens 10 is deformed to be at least partially spaced away from the human eye. For example, the deformation of the lens 10 can be an increase in the curvature of the lens 10.

In some embodiments, the contact lens may not include the detection unit 20, but only the deformation unit 30. In this case, a separate controller may be provided to control the deformation voltage received by the deformation unit 30.

In this embodiment, the lens 10 includes an optical area A1 and a non-optical area A2. The optical area A1 refers to a central area of the lens through which external light enters the pupil of the human eye. The non-optical area A2 surrounds the optical area A1 and is located along the edge of the lens 10. The detection unit 20 and the deformation unit 30 according to the embodiments of the present disclosure may be disposed in the optical area and may also be disposed in the non-optical area, which is not limited in the embodiments of the present disclosure. When the detecting unit 20 and the deforming unit 30 are not made of a transparent material, in the embodiment of the present disclosure, in order to avoid affecting the normal use of the contact lens, the detecting unit 20 and the deforming unit 30 are disposed in the non-optical area. When the detecting unit 20 and the deforming unit 30 are made of a transparent material, the detecting unit 20 and the deforming unit 30 may be disposed in the optical area, and may also be disposed in the non-optical area, which is not limited in the embodiments of the present disclosure.

Optionally, the lens 10 may be a non-myopic lens or a myopic lens, which is not limited in the embodiments of the present disclosure.

Optionally, the lens 10 is made of a flexible material such as silicone hydrogel or hydrated polymer. Optionally, the material of the lens 10 includes: methyl methacrylate or hydroxyethyl methacrylate, and the like, which is not limited in the embodiments of the present disclosure.

In the present embodiment, the detecting unit 20 can detect the water content of the lens 10 in real time. When the water contents detected at different time points are different, the deformation voltage supplied from the detecting unit 20 to the deformation unit 30 is also different, and the deformation generated by the deformation unit 30 varies. For example, when the water content detected by the detecting unit 20 increases, the deformation voltage supplied from the detecting unit 20 to the deformation unit 30 decreases, causing the deformation generated by the deformation unit 30 to decrease.

Optionally, the number of the detecting unit 20 may be one or more. If there is more than one detecting unit 20, i.e., a plurality of detecting units 20, the plurality of detecting units 20 may be uniformly or non-uniformly distributed on the lens, which is not limited in the embodiments of the present disclosure. For the purposes of illustration, FIG. 1 shows five detection units 20.

Optionally, the number of the deformation units 30 may be one or more. If there are more than one deformation unit 30, i.e., a plurality of deformation units 30, the plurality of deformation units 30 may be uniformly or non-uniformly distributed in the non-optical area, which is not limited in the embodiments of the present disclosure. For the purpose of illustration, FIG. 1 shows one deformation unit 30.

Optionally, the water content threshold is determined according to actual conditions, which is not limited in the embodiments of the present disclosure, and may be 50%, 60%, or the like.

The contact lens according to the embodiment of the present disclosure includes: the lens, the detecting unit, and the deformation unit. The detecting unit is connected to the deformation unit for detecting the water content of the lens. The detection unit supplies the deformation voltage to the deformation unit when the water content is not greater than the water content threshold. The deformation unit deform under the deformation voltage so that the lens is deformed to be at least partially spaced away from the human eye. In the embodiment of the present disclosure, by providing the detecting unit and the deformation unit in the contact lens, the water content of the contact lens is detected and the lens, when the water content is low, is spaced away from the human eye so that the cornea of the human eye can contact the air, reducing the corneal damage.

Optionally, as shown in FIG. 1, the contact lens according to the embodiment of the present disclosure further includes a power supply 40. The power supply 40 includes a first power supply electrode and a second power supply electrode. The first power supply electrode of the power supply 40 is connected to the detection unit 20, and the second power supply electrode of the power supply 40 is connected to the deformation unit 30.

Specifically, the power supply 40 may be disposed in the optical area of the lens 10, and may also be disposed in the non-optical area of the lens 10. In the case where the power supply 40 is transparent, the power supply 40 may be disposed the optical area or the non-optical area of the lens. In the case where the power supply 40 is not transparent, the power supply may be disposed in the non-optical area in order not to affect the user's view.

The first power supply electrode and the second power supply electrode are respectively a positive electrode and a negative electrode. When the first power supply electrode is the positive electrode, the second power supply electrode is the negative electrode. When the first power supply electrode is the negative electrode, the second power supply electrode is the positive electrode.

Optionally, the power supply 40 may be a power source. The power source may be an inductive charging device, a solar charging device, or a chemical battery. The solar charging device may include an organic solar cell or a perovskite solar cell. An organic solar cell is biocompatible and is easy to use due to the use of solar energy as its energy source. In order not to affect the view of the user, the power supply in the embodiments of the present disclosure may be transparent, which is not limited in the embodiments of the present disclosure.

Figure 2:
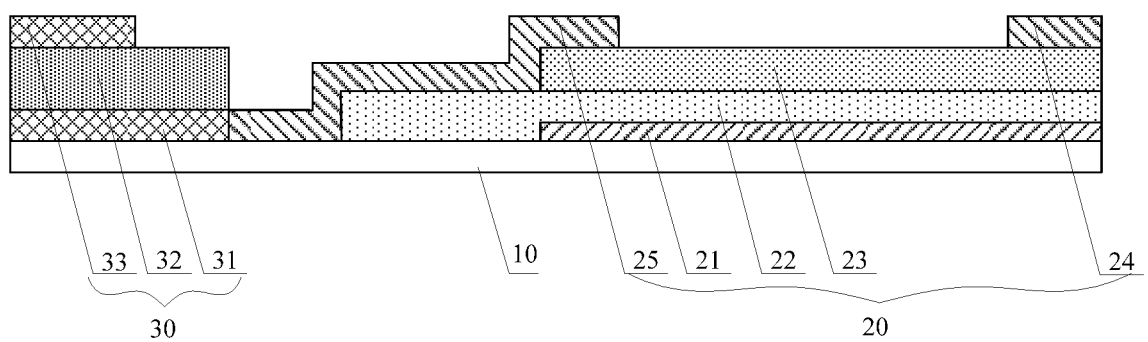
FIG. 2 is a schematic cross-sectional view of a detecting unit and a deformation unit according to an embodiment of the disclosure.
Figure 3:
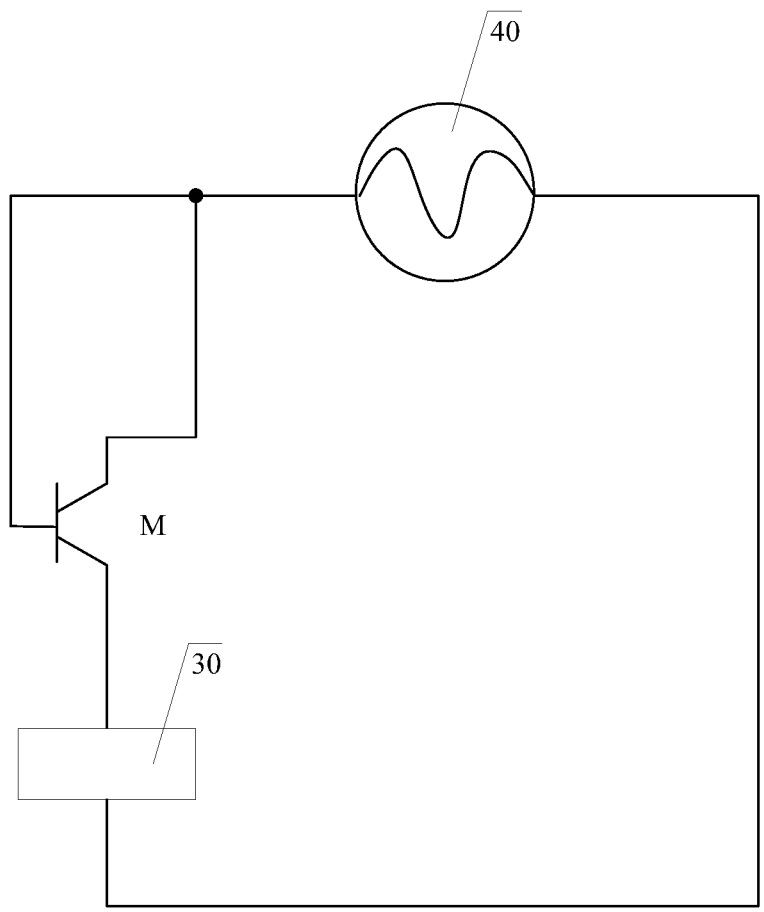
FIG. 3 is an equivalent circuit diagram of a contact lens according to an embodiment of the disclosure.

FIG. 2 is a cross-sectional view of the detecting unit and the deformation unit according to an embodiment of the disclosure. FIG. 3 is an equivalent circuit diagram of the contact lens according to an embodiment of the disclosure. As shown in FIG. 2 and FIG. 3, the detecting unit 20 in the contact lens provided by the embodiment of the present disclosure is a thin film transistor M. The thin film transistor M includes a control electrode 21, an insulating layer 22 disposed on the gate electrode 21, an active layer 23 disposed on the insulating layer 22, and a first transistor electrode 24 and a second transistor electrode 25 disposed on the active layer 23 and connected to the active layer 23.

In other embodiments, the detection unit 20 may be other water content sensors other than the thin film transistor M, such as a resistive water content sensor or a capacitive water content sensor.

In other embodiments, the thin film transistor M may have other configurations. For example, the insulating layer 22 is disposed on the active layer 23, the control electrode 21 is disposed on the insulating layer 22, an additional insulating layer is disposed on the control electrode 21, and the first transistor electrode 24 and the second transistor electrode 25 are disposed on the additional insulating layer and connected to the active layer 23 through via holes in the additional insulating layer.

In the present embodiment, the control electrode 21 is the gate electrode of the thin film transistor M, the first transistor electrode is one of the source and drain electrodes, and the second transistor electrode is the other of the source and drain electrodes. When the first transistor electrode 24 is the source electrode, the second transistor electrode 25 is the drain electrode, and when the first transistor electrode 24 is the drain electrode, the second transistor electrode 25 is the source electrode.

For example, in the present embodiment, the active layer 23 of the thin film transistor M is connected to the first power supply electrode of the power supply 40. The active layer 23 is in a first conductive state when the water content is not greater than the water content threshold, and is in a second conductive state when the water content is greater than the water content threshold. The active layer has an electric conductivity in the first conductive state greater than an electric conductivity in the second conductive state. For example, the first conductive state refers to a state where the active layer 23 is substantially conductive, and the second conductive state refers to a state where the active layer 23 is substantially insulated. The control electrode 21 and the first transistor electrode 24 of the thin film transistor M are connected to the first power supply electrode of the power supply 40, and the second transistor electrode 25 of the thin film transistor M is connected to the deformation unit 30.

Optionally, the material of the control electrode 21 may be a transparent conductive material, such as Indium Tin Oxide (ITO) or other transparent conductive nano metal material such as silver nanowires or the like, which is not limited in the embodiment of the present disclosure.

Optionally, in order to achieve the physiological compatibility of the contact lens, the insulating layer 22 in the embodiment of the present disclosure may be made of the same material with the lens.

Optionally, the material of the active layer 23 includes a moisture sensitive material, which may be an organic compound, an organic material, and flexible, such as pentacene. It should be noted that the moisture sensitive material in the embodiment of the present disclosure is a negative moisture sensitive material which is in the first conductive state when the water content is low, and in the second conductive state when the water content is high. Here, the use of the negative moisture sensitive material helps to reduce the energy consumption of contact lens. In other embodiments, the moisture sensitive material may be a positive moisture sensitive material, which is in a second conductive state when water content is low, and in a first conductive state when the water content is high. The moisture sensitive material may also include lithium chloride, $Fe_3O_4$, ZnO, $Al_2O_3$ or $TiO_2$, and the like.

Optionally, the first transistor electrode 24 and the second transistor electrode 25 may be metal electrodes or transparent conductive material electrodes, which is not limited in embodiments of the present disclosure.

The turning-on of the thin film transistor M in this embodiment depends not only on the voltage of the control electrode 21 but also on the conduction level of the active layer 23. When the water content varies, the conduction level of the active layer 23 varies and thus the deformation voltage supplied to the deformation unit 30 varies.

Optionally, when the material of the active layer 23 is pentacene, the thin film transistor M in the embodiment is a P-type thin film transistor. In order to ensure that the thin film transistor M is conductive so that the deformation voltage is supplied to the deformation unit 30 when the active layer 23 is in a conductive state, the first transistor electrode 24 and the control electrode 21 of the thin film transistor M are connected to the negative electrode of the power supply 40.

Optionally, as shown in FIG. 2 and FIG. 3, the deformation unit 30 in the contact lens according to the embodiment of the present disclosure includes: a first electrode 31, a deformable layer 32, and a second electrode 33.

For example, the deformable layer 32 is disposed between the first electrode 31 and the second electrode 33 and configured to deform under the action of an electric field between the first electrode 31 and the second electrode 33. The first electrode 31 is connected to the second transistor electrode 25 of the thin film transistor M and the second electrode 33 is connected to the positive electrode of the power supply.

Optionally, the first electrode 31 and the second electrode 33 are made of a transparent flexible conductive polymer such as PEDOT:PSS (poly(3,4-ethylenedioxythiophene) polystyrene sulfonate), or a transparent conductive material such as ITO, which is not limited by the embodiment of the present disclosure. Preferably, the electrode close to the human eye may be made of a transparent flexible conductive polymer, and the electrode away from the human eye may be made of a transparent conductive material.

It should be noted that when the first electrode 31 and the second transistor electrode 25 of the thin film transistor M are made of the same material, the first electrode 31 and the second transistor electrode 25 of the thin film transistor M can be formed by the same fabrication process.

Optionally, the material of the deformable layer 32 is an electrostrictive material. The electrostrictive material may be an inorganic material or an organic material, and may be a polyvinylidene fluoride copolymer (PVDF-TrFE), which is not limited in the embodiments of the present disclosure.

The working principle of the deformation unit in the embodiment of the present disclosure is described below. When the thin film transistor M is turned on, the voltage of the negative electrode of the power supply 40 is supplied to the first electrode 31 of the deformation unit 30. Because the second electrode 33 of the deformation unit 30 is connected to the positive electrode of the power supply 40, a voltage difference exists between the first electrode 31 and the second electrode 33. When the voltage changes, the intensity of the electric field applied to both sides of the deformable layer 32 changes, and the deformable layer deforms. Because the first electrode 31 and the second electrode 33 are flexible materials, when the deformable layer 32 deforms, the deformable layer 32 causes the first electrode 31 and the second electrode 32 to be deformed, so that the lens is deformed to be spaced away from the human eye, which allows the oxygen to permeate into the eye.

Figure 4A:
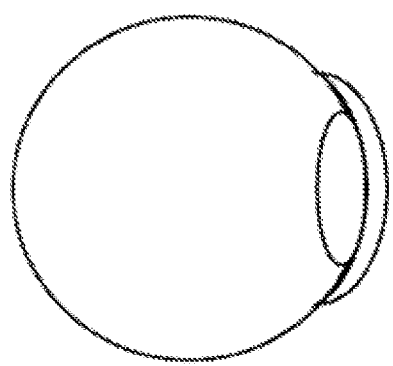
FIG. 4A is a schematic view of a contact lens according to an embodiment of the disclosure, the lens being not spaced away from an human eye.
Figure 4B:
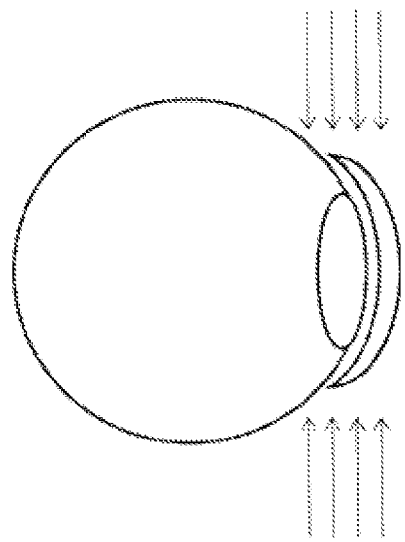
FIG. 4B is a schematic view of a contact lens according to an embodiment of the disclosure, the lens being spaced away from an human eye.

FIG. 4A is a schematic view of the contact lens according to an embodiment of the disclosure, the contact lens being not spaced away from a human eye. FIG. 4B is a schematic view of the contact lens according to an embodiment of the disclosure, the contact lens being not spaced away from a human eye. As shown in FIG. 4B, when the detected water content of the contact lens is low (for example, below the water content threshold), the contact lens according to the present embodiment deforms so that the lens 10 is deformed to at least partially spaced away from the human eye in order to allows the oxygen to permeate into the eye. As shown in FIG. 4B, the deformation of the lens 10 can be an increase in the curvature of the lens 10.

Optionally, the water content threshold is determined according to actual conditions, which is not limited in the embodiments of the present disclosure. For example, the contact lens may include other electrical components such as a resistor, a capacitor, or an additional thin film transistor. The water content threshold may be set by setting parameters of the detection unit 20 (which is a thin film transistor) and other electrical components in the contact lens. The water content threshold may also be set by other means, and the disclosure is not limited thereto. The water content threshold of the contact lens is fixed or adjustable.

In this embodiment, the detecting unit 20, the deformation unit 30, and the power supply 40 are disposed on the lens. Optionally, as an embodiment, the lens 10 is provided with a groove on a side close to the human eye or away from the human eye, and the detecting unit 20, the deformation unit 30 and the power supply 40 are disposed in the groove.

In this embodiment, the first electrode 31 in the deformation unit 30 is disposed on the side of the deformable layer 32 close to the lens 10.

Figure 5:
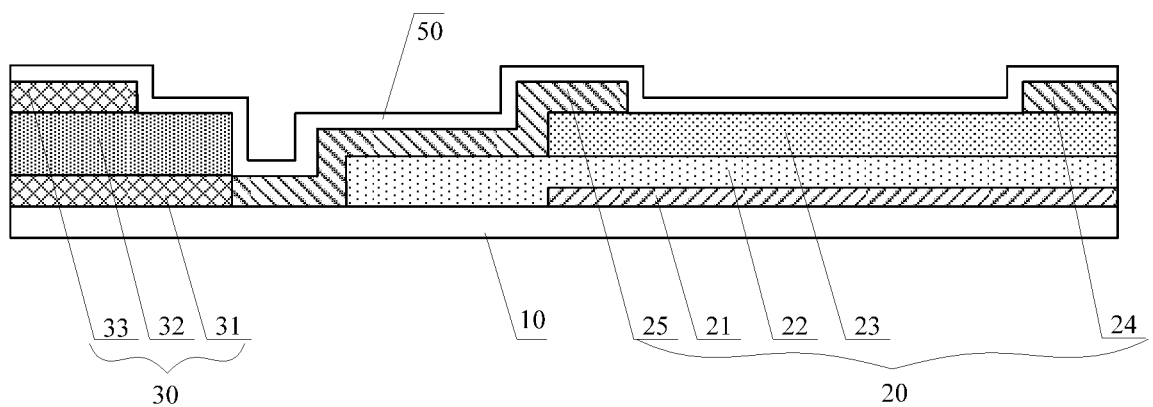
FIG. 5 is a schematic cross-sectional view of a contact lens according to an embodiment of the disclosure.

FIG. 5 is a cross-sectional view of a contact lens according to an embodiment of the present disclosure. As shown in FIG. 5, optionally, in order to achieve physiological compatibility, in this embodiment, the contact lens further includes: a protective layer 50 covering the detecting unit 20, the power supply 40, and the deformation unit 30.

When the groove is provided on the side of the lens 10 close to the human eye or away from the human eye, the detecting unit 20, the deformation unit 30 and the power supply 40 are disposed in the groove of the lens and the protective layer 50 attached to the lens 10 for example by the adhesive (not shown). In other embodiments, the protective layer 50 may be formed directly on the lens 10, for example directly cured onto the lens 10.

Optionally, in order to achieve the physiological compatibility of the contact lens, the protective layer 50 in the embodiment is made of the same material as the lens 10, or other insulating material that is able to be in contact with the human eye, such as polyimide, which is not limited in the embodiments of the present disclosure.

Optionally, as another embodiment, the detecting unit 20, the deformation unit 30, and the power supply 40 are encapsulated within the lens 10. The embodiment of the present disclosure does not specifically limit the away in which the detecting unit 20, the deformation unit 30, and the power supply 40 is mounted to the lens 10.

Optionally, the contact lens according to the embodiment of the present disclosure further includes: a communication transmission unit. The detecting unit is connected to the communication transmission unit and is further configured to enable an electrical connection of the communication transmission unit with the power supply when the water content is not greater than the water content threshold. The communication transmission unit may also be connected to the power supply and is configured to transmit information to an external device when being electrically connected with the power supply.

The communication transmission unit may be based on Wireless-Fidelity (Wi-Fi) communication, Radio Frequency (RF) communication, Near Field Communication (NFC) or Bluetooth wireless communication. The communication transmission unit be formed of circuits and may include a wireless transceiver or may only include a wireless transmitter.

In this embodiment, the information transmitted by the communication transmission unit is information related to the water content of the lens.

The working principle of the contact lens according to the embodiment of the present disclosure is described below. When the water content of the lens is lower than the water content threshold, the active layer of the thin film transistor is in the conductive state. At this time, the thin film transistor is turned on, so that the power supply, the detecting unit, and the deformation unit form an available current path. Therefore, the power supply supplies the voltage to the first electrode of the deformation unit, and the deformable layer deforms under the electric field provided by the first electrode and the second electrode, and causes the first electrode and the second electrode to be deform so that the lens is spaced away from the human eye. Thus, the oxygen permeability is increased and the risk of corneal damage is reduced. When the water content of the lens is higher than the water content threshold, the active layer of the thin film transistor is in the insulated state, and the thin film transistor is turned off. Therefore, the first electrode of the deformation unit is not supplied with a voltage, and there is no electric field between the first electrode and the second electrode. The lens is not spaced away from the human eye.

Embodiments of the present disclosure also provide a contact lens assembly including a contact lens and a terminal.

The contact lens can be a contact lens as described above and will not be described again.

The terminal is configured to receive water content information of the contact lens, and generate alarm information when the water content is not greater than the water content threshold.

Optionally, the alarm information is mainly used for early warning when the low water content is low, and may be in the form of vibration, ringing, illuminating, flashing or text. For example, in a case where a light-emitting diode (LED) is disposed in the terminal, the alarm information may be in the form of LED light which warns the user to hydrate the contact lens using artificial tear liquid, thereby avoiding the damage of the hypoxia cornea due to the water shortage.

The embodiment of the present disclosure can realize the smart warning through the interaction between the terminal and the contact lens, enriching the function of the contact lens and improving the experience of the user using the contact lens.

Optionally, the terminal includes a dedicated electronic device, a smart phone, a smart watch, a tablet computer, or a laptop computer, which is not limited in the embodiments.

Embodiments of the present disclosure also provide a method for manufacturing a contact lens, such as the contact lens as described above. The manufacturing method of the contact lens according to the embodiment of the present disclosure specifically includes the following steps:

S1), Providing the lens, in a surface of which the groove formed. When the contact lens is worn, the surface can be located on the side of the lens that is close to the human eye or away from the human eye.

S2), Mounting the detecting unit, the deformation unit and the power supply to the lens.

In an embodiment, the mounting of the detecting unit, the deformation unit and the power supply to the lens in step S2 may include: S21), disposing the detecting unit, the deformation unit and the power supply in the groove.

The lens includes the optical area and the non-optical area. The groove can be positioned in the non-optical area. For example, the detecting unit, the deformation unit, and the power supply may be formed on a flexible substrate in advance, and then the formed detecting unit, the formed deformation unit, and the formed power supply are disposed in the grooves of the lens.

Optionally, in this embodiment, after the detecting unit, the deformation unit, and the power supply are disposed in the groove, mounting the detecting unit, the deformation unit, and the power supply to the lens may further include: forming the protective layer on the side of the lens provided with the groove. For example, a coated adhesive is provided on the side of the lens provided with the groove, and a protective layer film is spin-coated to form the protective layer which is cured by irradiation of an ultraviolet ray.

Optionally, the adhesive is a UV curable glue.

Optionally, the manufacturing method of the contact lens according to the embodiment of the present disclosure may include forming the detecting unit. Forming the detecting unit includes: forming the control electrode of the detecting unit; and sequentially forming the insulating layer, the active layer, the first transistor electrode, and the second transistor electrode on the control electrode.

Optionally, the method for manufacturing the contact lens according to the embodiment of the present disclosure may include forming the deformation unit. Forming the deformation unit includes: forming the first electrode of the deformation unit; and sequentially forming the deformable layer and the second electrode on the first electrode.

Optionally, in this embodiment, forming the control electrode of the detecting unit on the lens includes: forming the control electrode of the detecting unit on the lens by using a magnetron sputtering process.

Optionally, in this embodiment, sequentially forming the insulating layer, the active layer, the first transistor electrode, and the second transistor electrode on the control electrode includes: forming the insulating layer by using a solution method, such as a spin coating method, on the control electrode. For example, the insulated layer is formed by heating and drying at a rotation rate of 3000-5000 rpm for 60 s and at a temperature below the lens withstand temperature. Sequentially forming the insulating layer, the active layer, the first transistor electrode and the second transistor electrode on the control electrode further includes: forming the active layer by an evaporation coating process on the insulating layer at a vacuum degree of $5 \times 10^{-4}$ Pa; and forming the first transistor electrode and the second transistor electrode on the active layer by a magnetron sputtering process.

Optionally, forming the deformation unit includes: forming a first electrode by coating an isopropanol solution, adding a flexible conductive polymer on the isopropanol solution, baking at a temperature of 100 to 150 degrees Celsius; forming a deformable layer by using an evaporation coating process on the first electrode; forming a second electrode by coating an isopropanol solution on the deformable layer, adding a flexible conductive polymer on the isopropanol solution, and baking at a temperature of 100 to 150 degrees Celsius.

In another embodiment, mounting the detecting unit, the deformation unit and the power supply to the lens in step S2 may include: S22), placing the detecting unit, the deformation unit and the power supply in a mold forming the lens, filling the material of the lens in the mold and then curing the material.

For example, the detecting unit, the deformation unit, and the power supply may be formed on the flexible substrate in advance, and then the formed detecting unit, the formed deformation unit, and the formed power supply are placed in the mold for forming the lens.

The drawings of the embodiments of the present disclosure relate only to the structures involved in the embodiments of the present disclosure, and other structures may refer to the general design.

For the sake of clarity, the thickness and size of the layers or microstructures are exaggerated in the drawings used to describe the embodiments of the present disclosure. It will be understood that when an element such as a layer, a film, an area or a substrate is referred to as being "on" or "under" the other element, the element may be directly "on" or "under" the other element, or there may be an intermediate element between them.

In the case of no conflict, the embodiments of the present disclosure and the features in the embodiments can be combined with each other to obtain a new embodiment.

Although the embodiments disclosed in the present disclosure are as described above, the content described is merely used to facilitate the understanding of the present disclosure, and are not intended to limit the present disclosure. Any modification or variation in the form and details of the implementation may be made by those skilled in the art without departing from the spirit and scope of the disclosure. The scope defined by the appended claims shall prevail

What is claimed is:

1. A contact lens comprising:
a lens, configured to be worn in a human eye;
a deformation unit, mounted to the lens and configured to receive a deformation voltage and deform according to the deformation voltage to make the lens deform to be at least partially spaced away from the human eye; and
a detecting unit, mounted to the lens and configured to detect a water content of the lens, and control the deformation voltage which is received by the deformation unit based on the detected water content,
wherein the detecting unit comprises a thin film transistor,
the thin film transistor comprises an active layer having an electrical conductivity that changes with the water content,
the deformation unit comprises: a first electrode, a deformable layer and a second electrode,
the deformable layer is formed between the first electrode and the second electrode, and
the deformation units are more than one and the deformation units are only distributed in a non-optical area and uniformly distributed in the non-optical area.

2. The contact lens according to claim 1, wherein
a deformation of the lens is an increase of a curvature of the lens.

3. The contact lens according to claim 1, wherein
in response to that the water content is not greater than a water content threshold, the active layer is in a first conductive state;

in response to that the water content is greater than the water content threshold, the active layer is in a second conductive state; and
an electrical conductivity of the active layer in the first conductive state is greater than an electrical conductivity of the active layer in the second conductive state.

4. The contact lens according to claim 1, wherein the active layer is formed of pentacene, lithium chloride, $Fe_3O_4$, ZnO, $Al_2O_3$ or $TiO_2$.

5. The contact lens according to claim 1, wherein the first electrode and the second electrode are formed of a transparent flexible conductive polymer, and the deformable layer is formed of an electrostrictive material.

6. The contact lens according to claim 1, further comprising:
a power supply, configured to supply power to the deformation unit via the detecting unit.

7. The contact lens according to claim 6,
wherein the power supply is an organic solar battery.

8. The contact lens according to claim 6, wherein
the power supply comprises a first power supply electrode and a second power supply electrode,
the thin film transistor includes a control electrode, a first transistor electrode, and a second transistor electrode,
the first transistor of the electrode of the thin film transistor is connected to the first power supply electrode of the power supply, the second transistor electrode of the thin film transistor is connected to the first electrode of the deformation unit, and the second electrode of the deformation unit is connected to the second power supply electrode of the power supply.

9. The contact lens according to claim 8, wherein
the control electrode of the thin film transistor is connected to the first power supply electrode of the power supply.

10. The contact lens according to claim 6, further comprising:
a protective layer, wherein
a groove of the lens is on a side of the lens;
the detecting unit, the deformation unit and the power supply are formed in the groove and the protective layer covers the detecting unit, the power supply, and the deformation unit on the lens.

11. The contact lens according to claim 10, wherein a material of the protective layer is the same with a material of the lens.

12. The contact lens according to claim 6, wherein the detection unit, the deformation unit, and the power supply are encapsulated within the lens.

13. The contact lens according to claim 6, further comprising: a communication transmission unit,
wherein the detecting unit is connected to the communication transmission unit, and is configured to enable an electrical connection of the communication transmission unit with the power supply in response to that water content is not greater than a water content threshold, and
the communication transmission unit is connected to the power supply and is configured to transmit information to an external device.

14. A contact lens assembly comprising:
a contact lens, comprising:
a lens, configured to be worn in a human eye; and
a deformation unit, mounted to the lens and configured to receive a deformation voltage and deform to be at least partially spaced away from the human eye according to the deformation voltage to make the lens deform; and
a detecting unit, mounted to the lens and configured to detect a water content of the lens and control the deformation voltage which is received by the deformation unit based on the detected water content; and
a terminal, configured to receive information about the water content from the contact lens and generate alarm information when the water content is not greater than a water content threshold, wherein the detecting unit comprises a thin film transistor, the thin film transistor comprises an active layer having an electrical conductivity that changes with the water content,
the deformation unit comprises: a first electrode, a deformable layer and a second electrode,
the deformable layer is formed between the first electrode and the second electrode, and
the deformation units are more than one and the deformation units are only distributed in a non-optical area and uniformly distributed in the non-optical area.

15. A contact lens comprising:
a lens, configured to be worn in a human eye;
a deformation unit, mounted to the lens and comprising a first electrode, a deformable layer and a second electrode, wherein the deformable layer is formed between the first electrode and the second electrode and configured to make the lens deform to be at least partially spaced away from the human eye; and
a detecting unit, mounted to the lens and comprising a thin film transistor, wherein the thin film transistor comprises an active layer having an electrical conductivity that changes with a water content of the lens, the detecting unit is configured to detect the water content of the lens and control the deformation voltage which is received by the deformation unit based on the detect,
the deformation unit comprises: a first electrode, a deformable layer and a second electrode,
the deformable layer is formed between the first electrode and the second electrode, and the deformation units are more than one and the deformation units are only distributed in a non-optical area and uniformly distributed in the non-optical area.

* * * * *